(12) United States Patent
Kerr

(10) Patent No.: US 6,837,807 B1
(45) Date of Patent: Jan. 4, 2005

(54) GOLF GREEN REPAIR TOOL

(76) Inventor: MacAuley Duff Kerr, 931 Harvard Ave., Billings, MT (US) 59102

( * ) Notice: Subject to any disclaimer, the term of this patent is extended or adjusted under 35 U.S.C. 154(b) by 0 days.

(21) Appl. No.: 10/348,376

(22) Filed: Jan. 21, 2003

Related U.S. Application Data
(60) Provisional application No. 60/355,055, filed on Jan. 22, 2002.

(51) Int. Cl.7 .............................................. A63B 57/00
(52) U.S. Cl. ...................................... 473/408; 473/286
(58) Field of Search ............................... 473/408, 286; D21/793; 172/378; 30/162, 163

(56) References Cited

U.S. PATENT DOCUMENTS

| | | | |
|---|---|---|---|
| 2,591,655 A | * | 4/1952 | Gerald .......................... 30/163 |
| 2,632,949 A | * | 3/1953 | Falcone ........................ 30/162 |
| 2,854,745 A | * | 10/1958 | Braverman ................... 30/162 |
| 3,539,017 A | | 11/1970 | Johnson |
| 4,884,805 A | | 12/1989 | Patterson |
| 4,998,726 A | | 3/1991 | Budnick |
| 5,388,824 A | | 2/1995 | Reimers |
| 5,405,133 A | | 4/1995 | Upton |
| 5,449,169 A | | 9/1995 | Hardin et al. |
| 5,562,553 A | | 10/1996 | Digerness et al. |
| 5,782,708 A | | 7/1998 | Kimball, Jr. |
| 6,413,174 B1 | | 7/2002 | Roberts |
| 6,428,430 B1 | | 8/2002 | Chong |
| D465,539 S | | 11/2002 | Tate |
| 6,620,062 B2 | * | 9/2003 | Taylor et al. ............... 473/408 |

* cited by examiner

Primary Examiner—Steven Wong
(74) Attorney, Agent, or Firm—Bernard S. Hoffman

(57) ABSTRACT

A golf green repair tool that includes a housing, a blade, locking apparatus, and extending apparatus. The blade is operatively attached to the housing, and has a retracted/stored position where it is contained within the housing and an extended/operational position where it is extended from the housing. The locking apparatus maintains the blade in each of its retracted/stored position and its extended/operational position by being engaged with the blade and releases the blade from each of its retracted/stored position and its extended/operational position by being disengaged from the blade. The extending apparatus automatically moves the blade from its retracted/stored position to its extended/operational position when the locking apparatus is released.

76 Claims, 3 Drawing Sheets

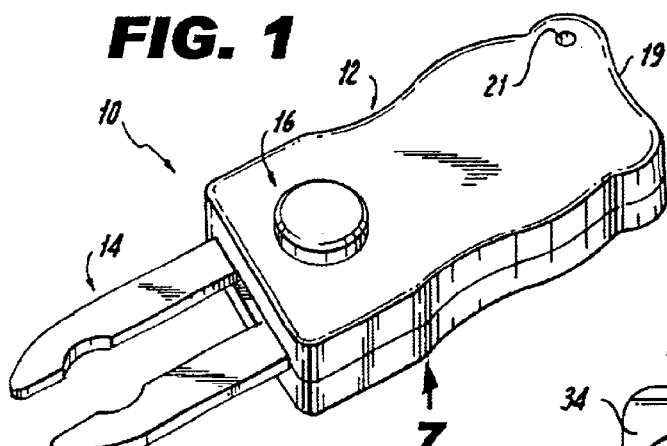
FIG. 1
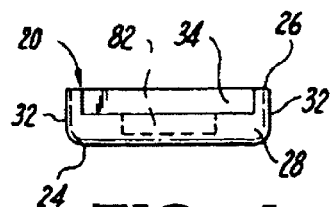
FIG. 4
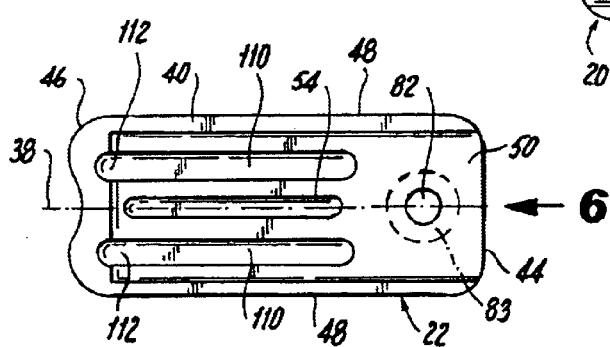
FIG. 3
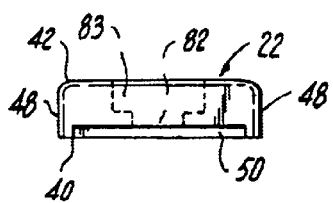
FIG. 6
FIG. 5
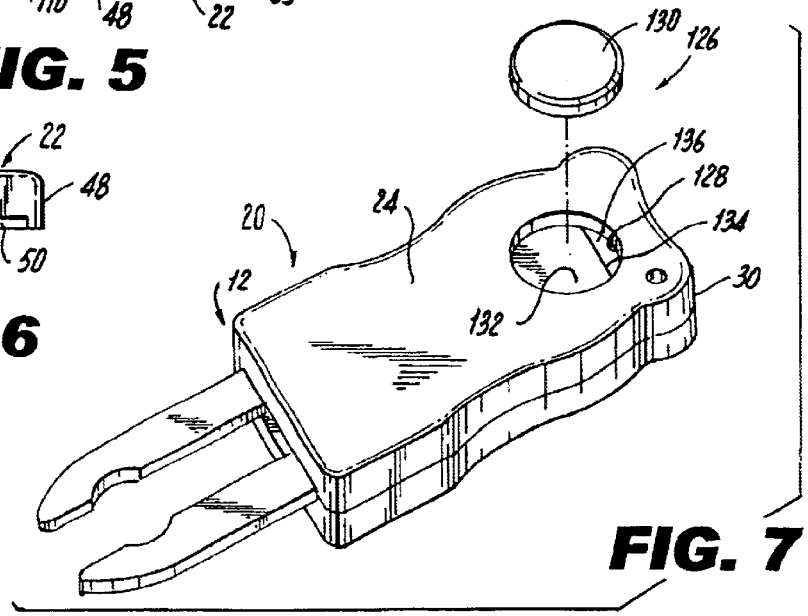
FIG. 7

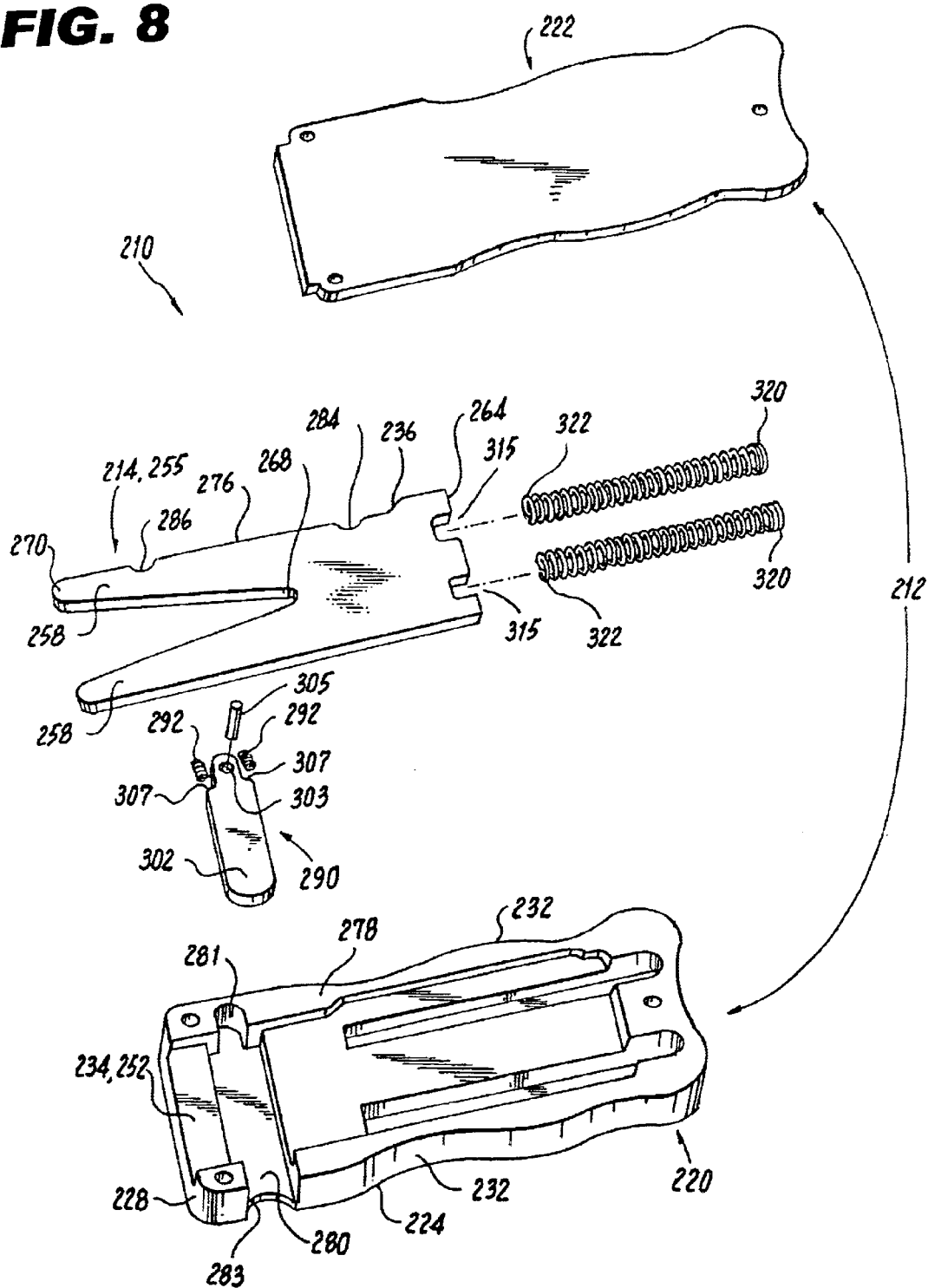

GOLF GREEN REPAIR TOOL

CROSS REFERENCE TO RELATED APPLICATIONS

The instant patent application is a Continuation-in-Part patent application of non-provisional patent application of provisional patent application Ser. No. 60/355,055, filed on Jan. 22, 2002, by Macauley Duff Kerr, for a GOLF GREEN REPAIR TOOL.

BACKGROUND OF THE INVENTION

1. Field of the Invention

The present invention relates to a repair tool. More particularly, the present invention relates to a golf green repair tool.

2. Description of the Prior Art

During the course of play, a golf green may be damaged by the impact of the golf ball landing on the green, particularly when it does so from a steep angle of approach. Typically, this may leave an indentation or depressed area on the putting surface. Common golf etiquette requires that the golfer who caused the indentation or other damage repair the defect for the benefit of future players.

Repair tools used for this purpose are well known. In general, a common golf green repair tool comprises an elongate planar sheet of metal formed with a handle at one end and two or more forks at its opposite end. In some more sophisticated designs of these repair tools, the characteristics of a folding pocket knife are employed. Some such pocket knives lock and some do not.

Another common design incorporates the sliding of a fork assembly from a handle using a push and slide method. In this design the fork or blade is associated with a button assembly which can be depressed. When said button assembly is depressed, the conjoined button and fork assembly can be slid down a track in the tool to a new position. This design, however, is difficult to use as the fork assembly is not automatically powered to move forward, and thus the user must simultaneously employ two actions, namely pushing of the button assembly and sliding of the button and associated fork assembly at the same time.

There are also several "switch blade" style repair tools on the market today, which use a pivot method. These, however, also have limitations in their ease of use as the user cannot wrap their fingers completely around the handle and must ensure their fingers are in a location that does not block the operation of the blade. In addition, the locking mechanisms of the switchblade designs are located on the outer edge of the blade.

Numerous specific innovations for golf green repair tools have been provided in the prior art. Even though these innovations may be suitable for the specific individual purposes to which they address, they each differ in structure and/or operation and/or purpose from the present invention.

FOR EXAMPLE, U.S. Pat. No. 3,539,017 to Johnson teaches a turf repairing tool in the form of a compact, rectangular case which can be carried in the pocket. A movable fork enclosed in the case has prongs which are extended from or retracted into the case by a button or knob accessible on top of the case for operating by the thumb.

ANOTHER EXAMPLE, U.S. Pat. No. 4,884,805 to Patterson teaches an apparatus for removing ball marks from golf course surfaces that includes an elongated handle having at one end thereof a tongue having prongs to be inserted into the turf, adjacent and beneath the ball mark. A tension spring attaches the tongue to the handle, and a compression spring spaces the tongue from the handle against the action of the tension spring. The tension spring attachment permits the tongue to pivot relative to the long axis of the handle, and the compression spring acts to return the tongue to alignment with the long axis of the handle after each use.

STILL ANOTHER EXAMPLE, U.S. Pat. No. 4,998,726 to Budnick teaches a light-weight, integrated, self-contained golf premium device to aid a golfer during a golf game comprising a generally rectangular two-piece case having a circular rotatable stroke counter, a retractable cleaning tool, a ball marker retainer and ball marker, an information display surface and an eyelet to secure the device to a key chain or golf bag. The two-piece case has a front and rear piece formed of a relatively rigid material which are fixedly secured to one another by conventional internal connecting elements. Each case piece has a generally planar wall with a peripheral edge, an upper and lower end, and a first side and a second side. The peripheral edges of the front and rear pieces are adapted to cooperate with each other to form the eyelet and to form the case for holding the ball marker, the stroke counter, and the retractable cleaning tool.

YET ANOTHER EXAMPLE, U.S. Pat. No. 5,388,824 to Reimers teaches a compact, manually-manipulable device constituting an assembly of golfing related accessories and aids secured in, and retractably extendible from, a body or housing of the device. Included as independent functional elements of the device are a divot fixer, a probe-like club face groove cleaner, and a wire brush. Additionally, a ball marker is removably secured in the body of the device. Each of the probe, brush, and divot repairer components is quickly and easily selectively slideably extended for functional use, while positive securement to the body of the device is preserved. The device may conveniently be carried in one's pocket for ready retrieval.

STILL YET ANOTHER EXAMPLE, U.S. Pat. No. 5,405,133 to Upton teaches a folding ball mark repair tool for repairing a ball mark depression in a golf green resulting from impact of a golf ball landing on the green thereby leaving the green free of a surface irregularity that may adversely effect putting conditions. The ball mark repair tool comprises an elongated flat blade for insertion under a concave ball mark in greens turf for prying the turf upwardly for smoothing thereof. The blade has two parallel pointed prongs extending from an end thereof. An elongated flattened handle has a longitudinal central slot formed therein wherein the blade shank is pivotally disposed such that the blade may be pivoted to a storage position thereof wherein the blade is disposed within the slot and a working position thereof wherein the blade is approximately 180 degree from the storage position extending out of the slot. A spring pivotally biases the blade to the working position. A latch is included whereby the blade may be releasably retained in the storage position. The latch is biased to a blade engageable latch position and also has a blade disengageable release position. The latch also has a finger engagement button formed on one end thereof which projects slightly above the surface of the handle when the rod is in the latch position whereupon finger pressure by a user causes the blade to spring from the storage position to the working position.

YET STILL ANOTHER EXAMPLE, U.S. Pat. No. 5,449,169 to Hardin teaches a retractable divot repair tool assembly comprising a divot repair tool in a generally planar configuration, the tool having long parallel side edges, a short linear bottom edge coupling the side edges and an upper portion formed in a generally V-shaped configuration and with the lower portion of the tool being in a generally rectangular configuration of a length slightly less than the length of the upper V-shaped portion with an aperture therethrough and a recess in the aperture; a housing in a generally box-like configuration having rectangular front and rear walls, a bottom wall at right angles with respect thereto and parallel side walls coupling the side edges of the front and rear walls and the side edges of the bottom wall, the container having an opened upper end, the container also having a longitudinal slot on the front wall along the majority of its length thereof parallel with the side walls and with short upper and lower transverse slots adjacent to the upper end and lower end of the longitudinal slot; and mechanisms to move the divot repair tool between a stored orientation within the container and an operative orientation exterior of the container.

STILL YET ANOTHER EXAMPLE, U.S. Pat. No. 5,562,553 to Digerness teaches a multipurpose golfer's tool comprising a body and a divot repair tool slidably received within the body. The divot repair tool comprises a fork-like end and a distal end opposite the fork-like end. A cover is hingedly attached to the distal end and is positioned on the exterior of the body. The cover is easily manipulable to slide the divot repair tool from a retracted position within the body to an operating position. The cover also has a generally planar surface for imprinting indicia thereon. The tool further comprises a pencil sharpener mounted in the body, a detachable ball marker mounted on the body, and a club head groove cleaner mounted on the body.

YET STILL ANOTHER EXAMPLE, U.S. Pat. No. 5,782,708 to Kimball Jr. teaches a golfing tool for repairing golf ball divots. The device comprises a divot repair tool attached to a retractable cord emerging from a housing. The divot repair tool is retracted back to the device after use by the golfer. A fastener, such as a belt clip or an alligator clip, attaches the device to the golfer's clothing. Furthermore, channels in the body receive golf tees, and a ball marker is releasably attached to either the divot repair tool or the housing.

STILL YET ANOTHER EXAMPLE, U.S. Pat. No. 6,413,174 to Roberts teaches a device that is a retractable golf divot repair tool, a tool for attaching and removing soft spikes from the soles of golf shoes, and a holder for a ball marker. A case is provided into which the pointed ends of the tool retract, and the case has an indentation provided in it to removably receive a ball marker that attaches magnetically to the indentation.

YET STILL ANOTHER EXAMPLE, U.S. Pat. No. 6,428,430 to Chong teaches a ball-mark repair tool that includes a housing having a longitudinal slot and an open end; a repair tool having an operative end and being slidably positioned in the housing for sliding along a path between a withdrawn position and an extending position, the operative end extending from the open end of the housing in the extending position; a latch member associated with the repair tool for sliding along the path with the repair tool and extending through the slot for manually moving the repair tool, the latch member further being positionable, when the repair tool is in the extending position, between a latching position wherein the repair tool is held in the extending position and a released position wherein the repair tool can be moved along the path to the withdrawn position.

It is apparent that numerous specific innovations for golf green repair tools have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide a golf green repair tool that avoids the disadvantages of the prior art.

ANOTHER OBJECT of the present invention is to provide a golf green repair tool that is simple to use.

STILL ANOTHER OBJECT of the present invention is to provide a golf green repair tool that has a power assisted blade to facilitate extension and retraction of said blade.

YET ANOTHER OBJECT of the present invention is to provide a golf green repair tool that can be activated by a simple one-handed operation.

STILL YET ANOTHER OBJECT of the present invention is to provide a golf green repair tool that has a blade with a positive lock mechanism, which ensures that the blade automatically locks in an extended or retracted position when required.

YET STILL ANOTHER OBJECT of the present invention is to provide a golf green repair tool that can be carried in a pocket, a golf bag, a cart, etc.

BRIEFLY STATED, STILL YET ANOTHER OBJECT of the present invention is to provide a golf green repair tool including a housing, a blade, locking apparatus, and extending apparatus. The blade is operatively attached to the housing, and has a retracted/stored position where it is contained within the housing and an extended/operational position where it is extended out from the housing. The locking apparatus maintains the blade in each of its retracted/stored position and its extended/operational position by being engaged with the blade and releases the blade from each of its retracted/stored position and its extended/operational position by being disengaged from the blade. The extending apparatus automatically moves the blade from its retracted/stored position to its extended/operational position when the locking apparatus is released.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the golf green repair tool of the present invention;

FIG. 3 is a diagrammatic top plan view taken generally in the direction of ARROW 3 in FIG. 2 of the first portion of the housing of the of the golf green repair tool of the present invention shown in FIG. 1;

FIG. 4 is a diagrammatic end view taken generally in the direction of ARROW 4 in FIG. 3 of the first portion of the housing of the golf green repair tool of the present invention shown in FIG. 1;

FIG. 5 is a diagrammatic bottom plan view taken generally in the direction of ARROW 5 in FIG. 2 of the second portion of the housing of the golf green repair tool of the present invention shown in FIG. 1;

FIG. 6 is a diagrammatic end view taken generally in the direction of ARROW 6 in FIG. 5 of the second portion of the housing of the golf green repair tool of the present invention shown in FIG. 1;

FIG. 7 is a diagrammatic perspective view taken generally in the direction of ARROW 7 in FIG. 1 of the golf green repair tool of the present invention shown in FIG. 1; and FIG. 8 is an exploded diagrammatic perspective view of an alternate embodiment of the golf green repair tool of the present invention.

LIST OF REFERENCE NUMERALS UTILIZED IN THE DRAWING

Figure 2:
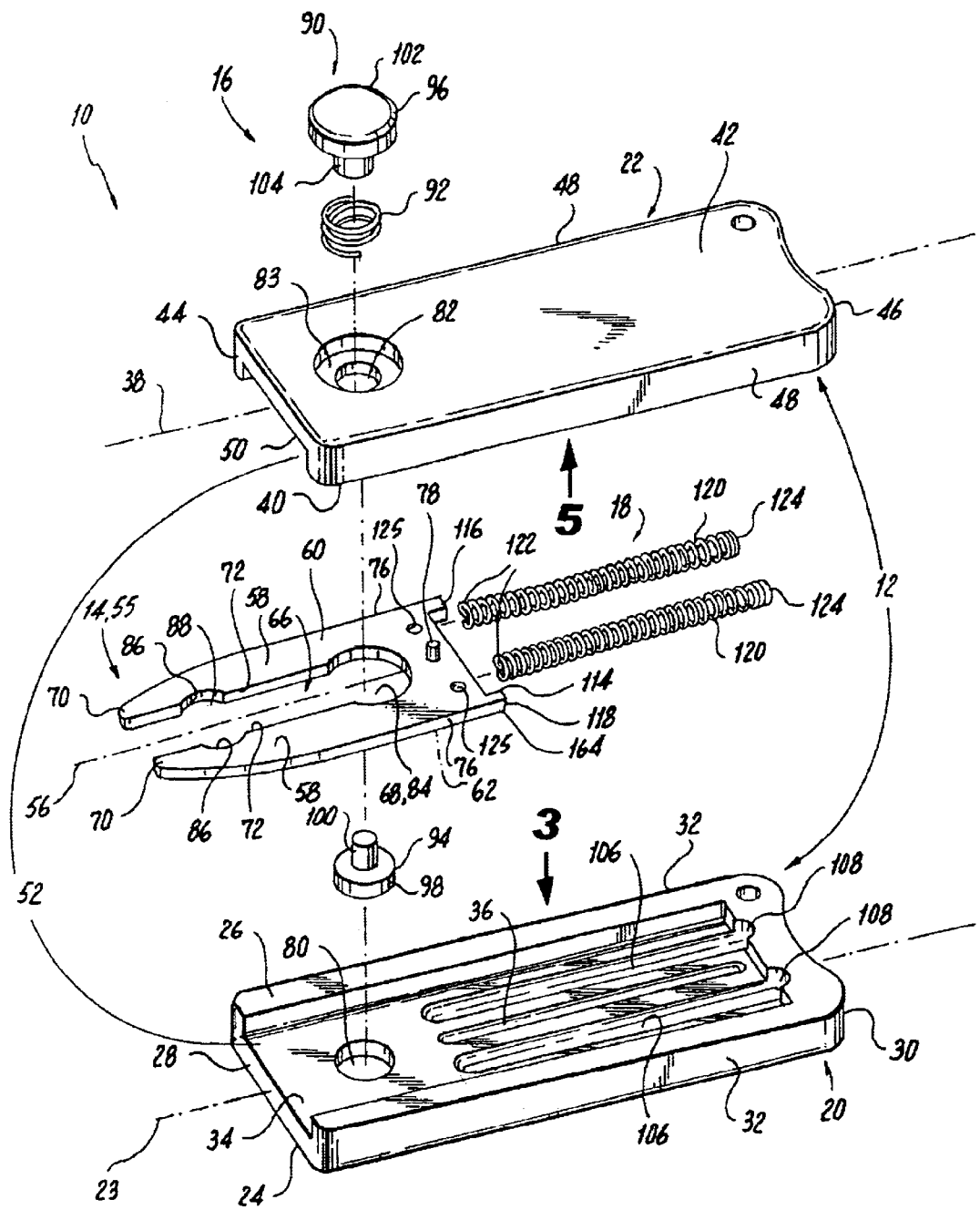
FIG. 2 is an exploded diagrammatic perspective view of the golf green repair tool of the present invention shown in FIG. 1.

Present Invention 10 golf green repair tool of present invention
12 housing for fitting in palm of hand
14 blade
16 locking apparatus
18 extending apparatus Housing 12

19 rear of housing 12 for having grip of golf club rest thereon when blade 14 is in extended/operational position thereof and is stuck into grass so as to prevent grip of golf club from moisture and/or chemicals from grass
20 first portion of housing 12
21 through bore in housing 12 for receiving key ring or small key chain
22 second portion of housing 12
23 longitudinal axis of first portion 20 of housing 12
24 outer surface of first portion 20 of housing 12
26 inner surface of first portion 20 of housing 12
28 front of first portion 20 of housing 12
30 rear of first portion 20 of housing 12
32 pair of sides of first portion 20 of housing 12
34 primary channel in first portion 20 of housing 12
36 center channel in first portion 20 of housing 12
38 longitudinal axis of second portion 22 of housing 12
40 inner surface of second portion 22 of housing 12
42 outer surface of second portion 22 of housing 12
44 front of second portion 22 of housing 12
46 rear of second portion 22 of housing 12
48 pair of sides of second portion 22 of housing 12
50 primary channel in second portion 22 of housing 12
52 common primary channel in housing 12
54 center channel in second portion 22 of housing 12

Blade 14

55 plate of blade 14
56 longitudinal axis of plate 55 of blade 14
58 pair of tines of plate 55 of blade 14
60 second housing portion-facing surface of plate 55 of blade 14
62 first housing portion-facing surface of plate 55 of blade 14
64 rear of plate 55 of blade 14
66 space between pair of tines 58 of plate 55 of blade 14
68 bight zone of pair of tines 58 of plate 55 of blade 14
70 pair of free ends of pair of tines 58 of plate 55 of blade 14
72 pair of inner facing edges of pair of tines 58 of plate 55 of blade 14
76 pair of outer edges of pair of tines 58 of plate 55 of blade 14
78 pin of plate 55 of blade 14

Locking Apparatus 16

80 blind bore in first portion 20 of housing 12 of locking apparatus 16
82 through bore in second portion 22 of housing 12 of locking apparatus 16
83 blind bore in second portion 22 of housing 12 of locking apparatus 16
84 extended position through bore in plate 55 of blade 14 of locking apparatus 16
86 pair of concave recesses in plate 55 of blade 14 of locking apparatus 16
88 retracted position through bore in plate 55 of blade 14 of locking apparatus 16
90 button of locking apparatus 16
92 coil spring of locking apparatus 16
94 inner portion of button 90 of locking apparatus 16
96 outer portion of button 90 of locking apparatus 16
98 disk of inner portion 94 of button 90 of locking apparatus 16
100 post of inner portion 94 of button 90 of locking apparatus 16
102 head of outer portion 96 of button 90 of locking apparatus 16
104 post of outer portion 96 of button 90 of locking apparatus 16

Extending Apparatus 18

106 pair of secondary channels in first portion 20 of housing 12 of extending apparatus 18
108 pair of seats in rear 30 of first portion 20 of housing 12 of extending apparatus 18
110 pair of secondary channels in second portion 22 of housing 12 of extending apparatus 18
112 pair of seats in rear 46 of second portion 22 of housing 12 of extending apparatus 18
114 recess in rear 64 of plate 55 of blade 14 of extending apparatus 18
116 tab of rear 64 of plate 55 of blade 14 of extending apparatus 18
118 another tab of plate 55 of blade 14 of extending apparatus 18
120 pair of coil springs of extending apparatus 18
122 front ends of pair of coil springs 120 of extending apparatus 18
124 rear ends of pair of coil springs 120 of extending apparatus 18

Miscellaneous 125 pair of dimples/depressions in plate 55 of blade 14
126 golf ball marker assembly
128 blind bore in outer surface 24 of first portion 20 of housing 12 of golf ball marker assembly 126
130 metal ball marker of golf ball marker assembly 126
132 magnet of golf ball marker assembly 126
134 ledge of magnet 132 of golf ball marker assembly 126
136 space in blind bore 128 in outer surface 24 of first portion 20 of housing 12 of golf ball marker assembly 126

Alternate Embodiment 210 golf green repair tool
212 housing 214 blade
220 first portion of housing 212
228 second portion of housing 212
232 front of first portion 220 of housing 212
234 pair of sides of first portion 220 of housing 212
236 primary channel in first portion 220 of housing 212
252 movable shoulder of plate 255 of blade 214
255 common primary channel in housing 212 plate of blade 214
258 pair of tines of plate 255 of blade 214
264 rear of plate 255 of blade 214
268 bite zone of pair of tines 258 of plate 255 of blade 214
270 pair of free ends of pair of tines 258 of plate 255 of blade 214
276 pair of outer edges of pair of tines 258 of plate 255 of blade 214
278 stationary shoulder of first portion 220 of housing 212
281 seat in one side of pair of sides 232 of first portion 220 of housing 212
283 outer surface of first portion 220 of housing 212
284 extended position concave recess in plate 255 of blade 214
286 retracted position concave recess in plate 255 of blade 214
289 blind slot in first portion 220 of housing 212
290 lever
292 pair of coil springs
302 head of lever 290
303 tail of lever 290
305 pin of lever 290
307 pair of seats of lever 290
315 pair of seats in rear 264 of 320 plate 255 of blade 214
322 pair of coil springs front ends of pair of coil springs 320

DETAILED DESCRIPTION OF THE INVENTION

Referring now to the figures, in which like numerals indicate like parts, and particularly to FIG. 1, which is a diagrammatic perspective view of the golf green repair tool of the present invention, the golf green repair tool of the present invention is shown generally at 10.

The overall configuration of the golf green repair tool 10 can best be seen in FIGS. 1 and 2, which are, again a diagrammatic perspective view of the golf green repair tool of the present invention, and an exploded diagrammatic perspective view of the golf green repair tool of the present invention shown in FIG. 1, and as such, will discussed with reference thereto.

The golf green repair tool 10 comprises a housing 12, a blade 14, and locking apparatus 16. The blade 14 is operatively attached to the housing 12, and has a retracted/stored position where it is contained within the housing 12 and an extended/operational position where it extended out from the housing 12, which are selectably achieved. The locking apparatus 16 lockingly maintains the blade 14 by being engaged therewith in, and releases the blade 14 by being disengaged therefrom from, each of the retracted/stored position thereof and the extended/operational position thereof.

When the blade 14 is lockingly maintained in the retracted/stored position thereof and the locking apparatus 16 is disengaged, movement of the blade 14 from the retracted/stored position thereof to the extended/operational position thereof is accomplished by a quick downward flicking of the golf green repair tool 10.

Movement of the blade 14 from the extended/operational position thereof back to the retracted/stored position thereof when the blade 14 is lockingly maintained in the extended/operational position thereof by the locking apparatus 16 is accomplished by releasing the locking apparatus 16 and pushing the blade 14 back into the housing 12.

The golf green repair tool 10 further comprises extending apparatus 18 (FIG. 2), The extending apparatus 18 is optional and displaces the blade 14 from the retracted/stored position thereof to the extended/operational position thereof automatically when the locking apparatus 16 is released, eliminating a need for the quick downward flicking of the golf green repair tool 10 as discussed supra.

The housing 12 has a rear 19 with a through bore 21. The rear 19 of the housing 12 is concave for having a grip of a golf club rest thereon when the blade 14 is in the extended/operational position thereof and is stuck into the grass so as to prevent the grip of the golf club from moisture and/or chemicals from the grass. The through bore 21 in the rear 19 of the housing 12 is for receiving a key ring or small key chain.

The specific configuration of the housing 12 can best be seen in FIGS. 2–6, which are, again an exploded diagrammatic perspective view of the golf green repair tool of the present invention shown in FIG. 1, a diagrammatic top plan view taken generally in the direction of ARROW 3 in FIG. 2 of the first portion of the housing of the golf green repair tool of the present invention shown in FIG. 1, a diagrammatic end view taken generally in the direction of ARROW 4 in FIG. 3 of the first portion of the housing of the golf green repair tool of the present invention shown in FIG. 1, a diagrammatic bottom plan view taken generally in the direction of ARROW 5 in FIG. 2 of the second portion of the housing of the golf green repair tool of the present invention shown in FIG. 1, and a diagrammatic end view taken generally in the direction of ARROW 6 in FIG. 5 of the second portion of the housing of the golf green repair tool of the present invention shown in FIG. 1, and as such, will discussed with reference thereto.

The housing 12 is shaped for fitting in the palm of a hand so as to form a handle, and comprises a first portion 20 and a second portion 22. The second portion 22 of the housing 12 is attached to the first portion 20 of the housing 12.

The first portion 20 of the housing 12 is generally rectangular-parallelepiped-shaped, and has a longitudinal axis 23, an outer surface 24, an inner surface 26, a front 28, a rear 30, and a pair of sides 32.

The first portion 20 of the housing 12 further has a primary channel 34. The primary channel 34 in the first portion 20 of the housing 12 extends longitudinally from, and opens into, the front 28 thereof, to just short of the rear 30 thereof, laterally from just short of one side 32 thereof to just short of the other side 32 thereof, and vertically from, and opens into, the inner surface 26 thereof to just short of the outer surface 24 thereof.

The first portion 20 of the housing 12 further has a center channel 36. The center channel 36 in the first portion 20 of the housing 12 extends in the inner surface 26 thereof, communicates with, and is narrower than, the primary channel 34 therein, and extends along the longitudinal axis 23 thereof, from short of the front 28 thereof to short of the rear 30 thereof.

The second portion 22 of the housing 12 is generally rectangular-parallelepiped-shaped, and has a longitudinal axis 38, an inner surface 40, an outer surface 42, a front 44, a rear 46, and a pair of sides 48.

The second portion 22 of the housing 12 further has a primary channel 50. The primary channel 50 in the second portion 22 of the housing 12 extends longitudinally from, and opens into, the front 44 thereof, to just short of the rear 46 thereof, laterally from just short of one side 48 thereof to just short of the other side 48 thereof, vertically from, and opens into, the inner surface 40 thereof to just short of the outer surface 42 thereof, and aligns with, and communicates with, the primary channel 34 in the first portion 20 of the housing 12 so as to form therewith a common primary channel 52.

It is to be understood that the common primary channel 52 in the housing 12 can also be just the primary channel 50 in the second portion 22 of the housing 12 with the primary channel 34 in the first portion 20 of the housing 12 being non-existent, and vise versa.

The second portion 22 of the housing 12 further has a center channel 54. The center channel 54 in the second portion 22 of the housing 12 extends in the inner surface 40 thereof, communicates with, and is narrower than, the primary channel 50 therein, extends along the longitudinal axis 38 thereof, from short of the front 44 thereof to short of the rear 46 thereof, and aligns with the center channel 36 in the first portion 20 of the housing 12.

The specific configuration of the blade 14 can best be seen in FIG. 2, which, again is an exploded diagrammatic perspective view of the golf green repair tool of the present invention shown in FIG. 1, and as such, will discussed with reference thereto.

The blade 14 is a plate 55. The plate 55 of the blade 14 slides longitudinally in the common primary channel 52 in the housing 12, between the retracted/stored position thereof and the extended/operational position thereof. The common primary channel 52 in the housing 12 is so sized so as to allow the plate 55 of the blade 14 to slide smoothly therein with a minimal amount of up and down movement so as to allow the plate 55 of the blade 14 to slide smoothly without resistance.

The plate 55 of the blade 14 is generally fork-like, and has a longitudinal axis 56, a pair of tines 58, a second housing portion-facing surface 60, a first housing portion-facing surface 62, and a rear 64. The pair of tines 58 of the plate 55 of the blade 14 are laterally spaced-apart so as to form a space 66 therebetween along the longitudinal axis 56 of the plate 55 of the blade 14, extend from a bight zone 68 to a pair of free ends 70, and have a pair of inner facing edges 72 and a pair of outer edges 76.

The plate 55 of the blade 14 further has a pin 78. The pin 78 of the plate 55 of the blade 14 is disposed on the longitudinal axis 56 thereof, between the bight zone 68 thereof and the rear 64 thereof, extends either vertically upwardly from the second housing portion-facing surface 60 thereof, vertically downwardly from the first housing portion-facing surface 62 thereof, or both, and slides in the center channel 54 in the second portion 22 of the housing 12, the center channel 36 in the first portion 20 of the housing 12, or both, depending upon its location without pressing against the second portion 22 of the housing 12, the first portion 20 of the housing 12, or both, depending upon its location so as not to be interfered thereby, to guide the plate 55 of the blade 14 to and from the retracted/stored position thereof and the extend/operational position thereof and form a stop preventing the plate 55 of the blade 14 from extending too far out of the housing 12 as it achieves the extended/operational position thereof.

The specific configuration of the locking apparatus 16 can best be seen in FIGS. 2–6, which are, again an exploded diagrammatic perspective view of the golf green repair tool of the present invention shown in FIG. 1, a diagrammatic top plan view taken generally in the direction of ARROW 3 in FIG. 2 of the first portion of the housing of the golf green repair tool of the present invention shown in FIG. 1, a diagrammatic end view taken generally in the direction of ARROW 4 in FIG. 3 of the first portion of the housing of the golf green repair tool of the present invention shown in FIG. 1, a diagrammatic bottom plan view taken generally in the direction of ARROW 5 in FIG. 2 of the second portion of the housing of the of the golf green repair tool of the present invention shown in FIG. 1, and a diagrammatic end view taken generally in the direction of ARROW 6 in FIG. 5 of the second portion of the housing of the golf green repair tool of the present invention shown in FIG. 1, and as such, will discussed with reference thereto.

The locking apparatus 16 comprises the first portion 20 of the housing 12 further having a blind bore 80. The blind bore 80 in the first portion 20 of the housing 12 extends in the inner surface 26 thereof, communicates with the primary channel 34 therein, and is disposed between the front 28 thereof and the center channel 36 therein, on the longitudinal axis 23 thereof.

The locking apparatus 16 further comprises the second portion 22 of the housing 12 further having a through bore 82. The through bore 82 in the second portion 22 of the housing 12 extends vertically therethrough, communicates with the primary channel 50 therein, is disposed between the front 44 thereof and the center channel 54 therein, on the longitudinal axis 38 thereof, and is coaxial with, and is smaller than, the blind bore 80 in the first portion 20 of the housing 12.

The locking apparatus 16 further comprises the second portion 22 of the housing 12 further having a blind bore 83. The blind bore 83 in the second portion 22 of the housing 12 extends through the outer surface 42 thereof, and is concentric with, larger than, and communicates with, the through bore 82 therein.

The locking apparatus 16 further comprises the plate 55 of the blade 14 further having an extended position through bore 84. The extended position through bore 84 in the plate 55 of the blade 14 extends vertically through the bite zone 68 thereof, on the longitudinal axis 56 thereof, and communicates with, and is wider than, the space 66 therein.

The locking apparatus 16 further comprises the plate 55 of the blade 14 further having a pair of concave recesses 86. The pair of concave recesses 86 in the plate 55 of the blade 14 directly oppose each other, extend vertically through the pair of inner facing edges 72 of the pair of tines 58 thereof, respectively, on opposite sides of the longitudinal axis 56 thereof, are disposed in proximity to the pair of free ends 70 of the pair of tines 58 thereof, and communicate with the space 66 therein, so together therewith, mimic the extended position through bore 84 therein and form a retracted position through bore 88 that is wider than the space 66 therein.

The locking apparatus 16 further comprises a button 90 and a coil spring 92. The button 90 of the locking apparatus 16 comprises a inner portion 94 and an outer portion 96. The inner portion 94 of the button 90 of the locking apparatus 16 has a disk 98 and a post 100 and the outer portion 96 thereof is mushroom-shaped and has a head 102 and a post 104 which are integral but can be more than one-piece.

The disk 98 of the inner portion 94 of the button 90 of the locking apparatus 16 is smaller in diameter and depth than the blind bore 80 in the first portion 20 of the housing 12, directly corresponds in size to the extended position through bore 84 in the plate 55 of the blade 14 and the retracted position through bore 88 in the plate 55 of the blade 14, and is larger in diameter than the through bore 82 in the second portion 22 of the housing 12.

The post 100 of the inner portion 94 of the button 90 of the locking apparatus 16 extends concentrically upwardly from, and is smaller than, the disk 98 thereof and is sized to fit through the extended position through bore 84 in the plate 55 of the blade 14, the retracted position through bore 88 in the plate 55 of the blade 14, the space 66 in the plate 55 of the blade 14, and the through bore 82 in the second portion 22 of the housing 12.

The head 102 of the outer portion 96 of the button 90 of the locking apparatus 16 fits in, and extend upwardly from, the blind bore 83 in the second portion 22 of the housing 12.

The post 104 of the outer portion 96 of the button 90 of the locking apparatus 16 extends concentrically downwardly from, and is smaller than, the head 102 thereof, fits through the through bore 82 in the second portion 22 of the housing 12, and coaxially joins, and is of a same diameter as, the post 100 of the inner portion 94 of the button 90 of the locking apparatus 16.

The coil spring 92 of the locking apparatus 16 surrounds the post 104 of the outer portion 96 of the button 90 and sits in the blind bore 83 in the second portion 22 of the housing 12 biasing the head 102 of the outer portion 96 of the button 90 away from the blind bore 83 in the second portion 22 of the housing 12, and in so doing, the disk 98 of the inner portion 94 of the button 90 is lockingly engaged in either the retracted position through bore 84 in the plate 55 of the blade 14 or the extended position through bore 88 in the plate 55 of the blade 14 depending upon if the blade 14 is in the retracted/stored position thereof or the extended operational position thereof, and in so doing, the blade 14 is lockingly maintained in the retracted/stored position and blocked against forward movement or in the extended/operational position and blocked against rearward movement depending upon if the blade 14 is in the retracted/stored position thereof or the extended operational position thereof.

When it is desired to release the blade 14 from the retracted/stored position or the extended position/operational position, the head 102 of the outer portion 96 of the button 90 of the locking apparatus 16 is depressed against biasing of the spring 92 thereof causing the inner portion 94 of the button 90 thereof to move downwardly causing the disk 98 of the inner portion 94 of the button 90 thereof to move down from, and disengage out of, the retracted position through bore 84 in the plate 55 of the blade 14 or the extended position through bore 88 in the plate 55 of the blade 14 depending upon if the blade 14 is in the retracted/stored position thereof or the extended operational position thereof and sit in the blind bore 80 in the first portion 20 of the housing 12 allowing the shaft 100 of the inner portion 94 of the button 90 thereof to enter the retracted position through bore 84 in the plate 55 of the blade 14 or the extended position through bore 88 in the plate 55 of the blade 14 depending upon if the blade 14 is in the retracted/stored position thereof or the extended operational position thereof and permit the blade 14 to slide between the retracted/stored position thereof and the extended/operational position thereof by virtue of the space 66 in the plate 55 of the blade 14 clearing, and not being blocked by, the shaft 100 of the inner portion 94 of the button 90.

It is to be understood that the other designs of the pair of concave recesses 86 in the plate 55 of the blade 14 could be employed which have the same effect of communicating with the disk 98 of the inner portion 94 of the button 90 of the locking apparatus 16 to lock the blade 14. For example, a concave recess may only be present on one inner facing edge 72 of the pair of tines 58 thereof, or alternately, a concave recess may be located on one outer edge 76 of the pair of tines 58 thereof in which case the disk 98 of the inner portion 94 of the button 90 of the locking apparatus 16 would be positioned to one side and be smaller.

The specific configuration of the extending apparatus 18 can best be seen in FIGS. 2, 3, and 5, which are, again an exploded diagrammatic perspective view of the golf green repair tool of the present invention shown in FIG. 1, a diagrammatic top plan view taken generally in the direction of ARROW 3 in FIG. 2 of the first portion of the housing of the golf green repair tool of the present invention shown in FIG. 1, and a diagrammatic bottom plan view taken generally in the direction of ARROW 5 in FIG. 2 of the second portion of the housing of the golf green repair tool of the present invention shown in FIG. 1, and as such, will be discussed with reference thereto.

The extending apparatus 18 comprises the first portion 20 of the housing 12 further having a pair of secondary channels 106. The pair of secondary channels 106 in the first portion 20 of the housing 12 extend in the inner surface 26 thereof, communicate with, and are narrower than, the primary channel 34 therein, straddle the center channel 36 therein, and extend from short of the blind bore 80 therein to into the rear 30 thereof so as to form a pair of seats 108.

The extending apparatus 18 further comprises the second portion 22 of the housing 12 further having a pair of secondary channels 110. The pair of secondary channels 110 in the second portion 22 of the housing 12 extend in the inner surface 40 thereof, communicate with, and are narrower than, the primary channel 50 therein, straddle the center channel 54 therein, extend from short of the through bore 82 therein to into the rear 46 thereof so as to form a pair of seats 112 that align with the pair of seats 108 in the second portion 22 of the housing 12, and align with the pair of secondary channels 106 in the first portion 20 of the housing 12.

The extending apparatus 18 further comprises the rear 64 of the plate 55 of the blade 14 having a recess 114. The recess 114 in the rear 64 of the plate 55 of the blade 14 extends from short of one outer edge 76 of the pair of tines 58 of the plate 55 of the blade 14 so as to form therewith a tab 116 to short of the other outer edge 76 of the pair of tines 58 of the plate 55 of the blade 14 so as to form therewith another tab 118. The tab 116 of the extending apparatus 18 and the another tab 118 of the extending apparatus 18 assist in aligning the blade 14 in the housing 12 and provide a sturdier blade when extended.

The extending apparatus 18 further comprises a pair of coil springs 120. The pair of coil springs 120 of the extending apparatus 18 have front ends 122 and rear ends 124. The pair of coil springs 120 of the extending apparatus 18 sit in the pair of secondary channels 106 in the first portion 20 of the housing 12 and the pair of secondary channels 110 in the second portion 22 of the housing 12, respectively, with the rear ends 124 thereof sitting in the pair of seats 108 in the first portion 20 of the housing 12 and the pair of seats 112 in the second portion 22 of the housing 12, respectively, and with the front ends thereof 122 sitting in the recess 114 in the rear 64 of the plate 55 of the blade 14, and in so doing, bias the blade 14 into the extended/operational position thereof for quick achievement thereof.

The pair of secondary channels 106 in the first portion 20 of the housing 12 and the pair of secondary channels 110 in the second portion 22 of the housing 12 prevent the pair of coil springs 120 of the extending apparatus 18 from being exposed and from failing to operate or move to a position that would prevent extension thereof directly forward.

It is to be understood that the pair of coil springs 120 of the extending apparatus 18 can be any resilient biasing apparatus. If the resilient biasing apparatus is coil springs, any number of coil springs can be used, with the number of secondary channels 106 and 110 being accommodating therefor and being in either the first portion 20 of the housing 12, the second portion 22 of the housing 12, or both. If the resilient biasing apparatus is a flat watch style spring, however, an accommodating channel may or may not be needed.

The plate 55 of the blade 14 further has a pair of dimples/depressions 125. The pair of dimples/depressions 125 in the plate 55 of the blade 14 laterally straddle the pin 78 of the plate 55 of the blade 14, extend either vertically upwardly from the second housing portion-facing surface 60 thereof, vertically downwardly from the first housing portion-facing surface 62 thereof, both, or one up and one down, and slidably engage in the pair of secondary channels 110 in the second portion 22 of the housing 12, the pair of secondary channels 106 in the first portion 20 of the housing 12, or both, depending upon their location, to further guide the plate 55 of the blade 14 to and from the retracted/stored position thereof and the extend/operational position thereof by preventing lateral walking thereof and form another stop preventing the plate 55 of the blade 14 from extending to far out of the housing 12 as it achieves the extended/operational position thereof.

It is to be understood that the stop(s) of the plate 55 of the blade 14 can be the pin 78, at least one of the pair of dimples/depressions 125, or both, and that the post 104 of the outer portion 96 of the button 90 of the locking apparatus 16 does not have to be of the same diameter as the post 100 of the inner portion 94 of the button 90 thereof.

So it has been shown that the blade may be power assisted. Preferably, movement of the blade from the retracted/stored position thereof to the extend/operational position thereof is assisted by one or more springs. The spring or springs may be any resilient biasing means. Alternatively, no springs are included. Preferably, the locking apparatus comprises a button component. The button component may be mushroom shaped and comprise of a head and post. Furthermore, the second portion of the housing may optionally comprise more than one piece.

As shown in FIG. 7, which is a diagrammatic perspective view taken generally in the direction of ARROW 7 in FIG. 1 of the golf green repair tool of the present invention shown in FIG. 1, the golf green repair tool 10 further comprises golf ball marker assembly 126.

The ball marker assembly 126 comprises the outer surface 24 of the first portion 20 of the housing 12 having a blind bore 128 therein. The blind bore 128 in the outer surface 24 of the first portion 20 of the housing 12 releasably fits a metal ball marker 130.

The ball marker assembly 126 further comprises a magnet 132. The magnet 132 of the ball marker assembly 126 is disposed in the blind bore 128 in the outer surface 24 of the first portion 20 of the housing 12, and is releasably engaged by the metal ball marker 130, but does not fully occupy the blind bore 128 in the outer surface 24 of the first portion 20 of the housing 12 so as to form a ledge 134 therewith and a space 136 therebetween so as to allow the metal ball marker 130 of the ball marker assembly 126 to be removed from the magnet 132 thereof by pressing on the metal ball marker 130 thereof over the space 136 of the blind bore 128 in the outer surface 24 of the first portion 20 of the housing 12 causing the metal ball marker 130 thereof to pivot upwardly on the ledge 134 of the magnet 132 thereof.

It will be appreciated in all cases that the design of the tool could be reversed, so that, among other things, the blind bore to hold the magnetic material and ball mark disk can be on the outer surface of the second portion of the housing.

Furthermore, it is to be appreciated that the coil spring 92 of the locking apparatus 16 can be any resilient biasing apparatus, and that further it can be moved to sit in the blind bore 80 in the first portion 20 of the housing 12.

An alternate embodiment of the golf green repair tool 110 can best be seen in FIG. 8, which is an exploded diagrammatic perspective view of an alternate embodiment of the golf green repair tool of the present invention, and as such, will be discussed with reference thereto.

The golf green repair tool 210 is identical to the golf green repair tool 10, but with some differences.

The second portion 222 of the housing 212 is smaller in depth than the first portion 220 thereof, the through bore 82 and the blind bore 83 in the second portion 22 of the housing 12 are eliminated, the pair of dimples/depressions 125 in the plate 55 of the blade 14 are eliminated, and the primary channel 50 in the second portion 22 of the housing 12 is eliminated so as to allow the common primary channel 252 to be the primary channel 234 in the first portion 220 of the housing 212.

The center channel 36 in the first portion 20 of the housing 12 and the center channel 54 in the second portion 22 of the housing 12 are eliminated and so is the pin 78 of the plate 55 of the blade 14 that cooperates therewith.

In their place, the first portion 220 of the housing 212 has a stationary shoulder 278 and the plate 255 of the blade 214 has a movable shoulder 236 that cooperates with the stationary shoulder 278. The stationary shoulder 278 of the first portion 220 of the housing 212 protrudes inwardly from one side 232 thereof into the primary channel 234 therein, and is disposed in proximity to the front 228 thereof. The movable shoulder 236 of the plate 255 of the blade 214 is disposed on one outer edge 276 thereof in proximity to the rear 264 thereof and prevents the plate 255 of the blade 214 from extending too far out of the housing 212 as it achieves the extended/operational position thereof by stopping against the stationary shoulder 278 in the first portion 220 of the housing 212.

The blind bore 80 in the first portion 20 of the housing 12 is replaced by a blind slot 280 and the outer surface 224 thereof has a recess 283. The blind slot 280 in the first portion 220 of the housing 212 extends laterally from, and open into, both the other side 232 thereof and the recess 283 in the outer surface 224 thereof, to into the one side 232 thereof so as to form a seat 281, communicates with, and is deeper than, the primary channel 234 therein, and is disposed between the front 228 thereof and the stationary shoulder 278 therein. The seat 281 in the one side 232 of the first portion 220 of the housing 212 is narrower than, and coaxial with, the blind slot 280 therein.

The extended position through bore 84 in the plate 55 of the blade 14 is replaced by an extended position concave recess 284. The extended position concave recess 284 in the plate 255 of the blade 214 extends vertically through the one outer edge 276 thereof, and is disposed between the bite zone 268 thereof and the movable shoulder 236 thereon.

The pair of concave recesses 86 in the plate 55 of the blade 14 are replaced by a retracted position concave recess 286. The retracted position concave recess 286 in the plate 255 of the blade 214 extends vertically through the one outer edge 276 thereof, and is disposed in proximity to an associated free end 270 of the pair of tines 258 thereof.

The button 90 and the coil spring 92 are replaced by a lever 290 and a pair of coil springs 292. The lever 290 has a head 302, a tail 303, and a pin 305.

The tail 303 of the lever 290 is narrower than, and coaxial with, the head 302 thereof so as to form a pair of seats 307 therewith, and the pin 305 thereof extends vertically upwardly from the tail 302 thereof. The head 302 of the lever 290 extends along the blind slot 280 in the first portion 222 of the housing 212 thereof, inwardly from, and is accessible from, the recess 283 in the outer surface 224 of the first portion 220 of the housing 212 to the tail 303. The tail 303 of the lever 290 is sized to fit in the seat 281 in the one side 232 of the first portion 220 of the housing 212.

The pair of coil springs 292 sit in the pair of seats 307 on the head 302 of the lever 290, respectively, and extend to the one side 232 of the first portion 220 of the housing 212, straddling the seat 281 in the one side 232 of the first portion 220 of the housing 212, and in so doing, bias the tail 303 of the lever 290 away from the seat 281 in the one side 232 of the first portion 220 of the housing 212, and in so doing, the pin 305 is lockingly engaged in either the retracted position concave recess 284 in the plate 255 of the blade 214 or the extended position concave recess 286 in the plate 255 of the blade 214 depending upon if the blade 214 is in the retracted/stored position thereof or the extended operational position thereof, and in so doing, the blade 214 is lockingly maintained in the retracted/stored position and blocked against forward movement or in the extended/operational position and blocked against rearward movement depending upon if the blade 214 is in the retracted/stored position thereof or the extended operational position thereof.

When it is desired to release the blade 214 from the retracted/stored position or the extended position/operational position, the head 302 of the lever 290 is depressed inwardly against biasing of the pair of coil springs 292 thereof causing the tail 303 of the lever 290 to enter the seat 281 in the one side 232 of the first portion 220 of the housing 212, and in so doing, causes the pin 305 of the lever 290 to move out from, and disengage out of, the retracted position concave recess 284 in the plate 255 of the blade 214 or the extended position concave recess 286 in the plate 255 of the blade 214 depending upon if the blade 214 is in the retracted/stored position thereof or the extended operational position thereof and sit in the seat 281 in the one side 232 of the first portion 220 of the housing 212 permitting the blade 214 to slide between the retracted/stored position thereof and the extended/operational position thereof.

It is to be understood, however, that the pair of coil springs 292 can be one spring, a watch style or Z spring, and that the tail 303 can be moved to one side.

The recess 114 in the rear 64 of the plate 55 of the blade 14 is optionally divided in two so as to form a pair of seats 315 that receive the front ends 322 of the pair of coil springs 320, respectively.

It will be understood that each of the elements described above, or two or more together, may also find a useful application in other types of constructions differing from the types described above.

While the invention has been illustrated and described as embodied in a golf green repair tool, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A golf green repair tool, comprising:

a) a housing;

b) a blade;

c) first means; and d) second means;

wherein said blade is operatively attached to said housing;

wherein said blade moves axially relative to said housing;

wherein said blade has a retracted/stored position;

wherein said blade is contained within said housing when in said retracted/stored position thereof;

wherein said blade has an extended/operational position;

wherein said blade is extended axially out from said housing when in said extended/operational position thereof;

wherein said retracted/stored position of said blade and said extended/operational position are selectably achieved;

wherein said first means lockingly maintains said blade in each of said retracted/stored position thereof and said extended/operational position thereof by being engaged with said blade;

wherein said first means releases said blade from each of said retracted/stored position thereof and said extended/operational position thereof by being disengaged from said blade;

wherein axial movement of said blade from said retracted/stored position thereof to said extended/operational position thereof when said blade is lockingly maintained in said retracted/stored position by said first means is accomplished by disengaging said first means;

wherein axial movement of said blade from said extended/operational position thereof back to said retracted/stored position thereof when said blade is lockingly maintained in said extended/operational position thereof by said first means is accomplished by disengaging said first means and pushing said blade axially back into said housing;

wherein said second means axially displaces said blade from said retracted/stored position thereof to said extended/operational position thereof automatically when said first means is released;

wherein said second means includes first resilient biasing apparatus;

wherein said housing is shaped for fitting in the palm of a hand so as to form a handle;

wherein said housing comprises:

i) a first portion; and ii) a second portion;

wherein said second portion of said housing is attached to said first portion of said housing;

wherein said first portion of said housing has:

i) a longitudinal axis;

ii) an outer surface;

iii) an inner surface;

iv) a front;

v) a rear;

vi) a pair of sides; and vii) a primary channel; and wherein said first portion of said housing has a center channel.

2. The tool as defined in claim 1, wherein said primary channel in said first portion of said housing extends longitudinally from said front thereof to just short of said rear thereof;

wherein said primary channel in said first portion of said housing opens into said front thereof;

wherein said primary channel in said first portion of said housing extends laterally from just short of one side thereof to just short of the other side thereof;

wherein said primary channel in said first portion of said housing extends vertically from said inner surface thereof to just short of said outer surface thereof; and wherein said primary channel in said first portion of said housing opens into said inner surface thereof.

3. The tool as defined in claim 1, wherein said center channel in said first portion of said housing extends in said inner surface thereof;

wherein said center channel in said first portion of said housing communicates with said primary channel therein;

wherein said center channel in said first portion of said housing is narrower than said primary channel therein; and wherein said center channel in said first portion of said housing extends along said longitudinal axis thereof, from short of said front thereof to short of said rear thereof.

4. The tool as defined in claim 1, wherein said second portion of said housing has:

a) a longitudinal axis;

b) an inner surface;

c) an outer surface;

d) a front;

e) a rear;

f) a pair of sides; and g) a primary channel.

5. The tool as defined in claim 4, wherein said primary channel in said second portion of said housing extends longitudinally from said front thereof to just short of said rear thereof;

wherein said primary channel in said second portion of said housing opens into said front thereof;

wherein said primary channel in said second portion of said housing extends laterally from just short of one side thereof to just short of the other side thereof;

wherein said primary channel in said second portion of said housing extends vertically from said inner surface thereof to just short of said outer surface thereof; and wherein said primary channel in said second portion of said housing opens into said inner surface thereof.

6. The tool as defined in claim 4, wherein said primary channel in said second portion of said housing aligns with said primary channel in said first portion of said housing; and wherein said primary channel in said second portion of said housing communicates with said primary channel in said first portion of said housing so as to form therewith a common primary channel.

7. The tool as defined in claim 6, wherein said second portion of said housing has a center channel.

8. The tool as defined in claim 7, wherein said center channel in said second portion of said housing extends in said inner surface thereof;

wherein said center channel in said second portion of said housing communicates with said primary channel therein;

wherein said center channel in said second portion of said housing is narrower than said primary channel therein;

wherein said center channel in said second portion of said housing extends along said longitudinal axis thereof, from short of said front thereof to short of said rear thereof; and wherein said center channel in said second portion of said housing aligns with said center channel in said first portion of said housing.

9. The tool as defined in claim 7, wherein said blade is a plate;

wherein said plate of said blade slides longitudinally in one of said primary channel in said first housing portion of said housing, said primary channel in said second portion of said housing, and said common channel in said housing, between said retracted/stored position thereof and said extended/operational position thereof; and wherein said one of said primary channel in said first housing portion of said housing, said primary channel in said second portion of said housing, and said common channel in said housing, depending upon which exists, is so sized so as to allow said plate of said blade to slide smoothly therein with a minimal amount of up and down movement so as to allow said plate of said blade to slide smoothly without resistance.

10. The tool as defined in claim 9, wherein said plate of said blade is generally fork-like;

wherein said plate of said blade has:

a) a longitudinal axis;

b) a pair of tines;

c) a second housing portion-facing surface;

d) a first housing portion-facing surface; and e) a rear;

wherein said pair of tines of said plate of said blade are laterally spaced-apart from each other so as to form a space therebetween;

wherein said space between said pair of tines of said plate of said blade extends along said longitudinal axis of said plate of said blade;

wherein said pair of tines of said plate of said blade extend from a bight zone to a pair of free ends; and wherein said pair of tines of said plate of said blade have:

a) a pair of inner facing edges; and b) a pair of outer edges.

11. The tool as defined in claim 10, wherein said plate of said blade has a pin;

wherein said pin of said plate of said blade is disposed on said longitudinal axis thereof;

wherein said pin of said plate of said blade is disposed between said bight zone thereof and said rear thereof;

wherein said pin of said plate of said blade extends at least one of vertically upwardly from said second housing portion-facing surface thereof and vertically downwardly from said first housing portion-facing surface thereof; and wherein said pin of said plate of said blade slides in at least one of said center channel in said first portion of said housing and said center channel in said second portion of said housing, depending upon location of said pin of said plate of said blade, without pressing against at least one of said first portion of said housing and said second portion of said housing, depending upon said location of said pin of said plate of said blade, so as not to be interfered thereby, to guide said plate of said blade to and from said retracted/stored position thereof and said extend/operational position thereof and form a stop preventing said plate of said blade from extending too far out of said housing as it achieves said extended/operational position thereof.

12. The tool as defined in claim 10, wherein said first means includes said first portion of said housing having a blind bore.

13. The tool as defined in claim 12, wherein said blind bore in said first portion of said housing extends in said inner surface thereof;

wherein said blind bore in said first portion of said housing communicates with said primary channel therein;

wherein said blind bore in said first portion of said housing is disposed between said front thereof and said center channel therein; and wherein said blind bore in said first portion of said housing is disposed on said longitudinal axis thereof.

14. The tool as defined in claim 12, wherein said first means includes said second portion of said housing having a through bore.

15. The tool as defined in claim 14, wherein said through bore in said second portion of said housing extends vertically therethrough;

wherein said through bore in said second portion of said housing communicates with said primary channel therein;

wherein said through bore in said second portion of said housing is disposed between said front thereof and said center channel therein;

wherein said through bore in said second portion of said housing is disposed on said longitudinal axis thereof;

wherein said through bore in said second portion of said housing is coaxial with said blind bore in said first portion of said housing; and wherein said through bore in said second portion of said housing is smaller than said blind bore in said first portion of said housing.

16. The tool as defined in claim 14, wherein said first means includes said second portion of said housing having a blind bore.

17. The tool as defined in claim 16, wherein said blind bore in said second portion of said housing extends in said outer surface thereof;

wherein said blind bore in said second portion of said housing is concentric with said through bore therein;

wherein said blind bore in said second portion of said housing is larger than said through bore therein; and wherein said blind bore in said second portion of said housing communicates with said through bore therein.

18. The tool as defined in claim 16, wherein said first means includes said plate of said blade having an extended position through bore.

19. The tool as defined in claim 18, wherein said extended position through bore in said plate of said blade extends vertically through said bite zone thereof;

wherein said extended position through bore in said plate of said blade is disposed on said longitudinal axis thereof;

wherein said extended position through bore in said plate of said blade communicates with said space therein; and wherein said extended position through bore in said plate of said blade is wider than said space therein.

20. The tool as defined in claim 18, wherein said first means includes said plate of said blade having a pair of concave recesses.

21. The tool as defined in claim 20, wherein said pair of concave recesses in said plate of said blade directly oppose each other;

wherein said pair of concave recesses in said plate of said blade extend vertically through said pair of inner facing edges of said pair of tines thereof, respectively;

wherein said pair of concave recesses in said plate of said blade extend on opposite sides of said longitudinal axis thereof;

wherein said pair of concave recesses in said plate of said blade are disposed in proximity to said pair of free ends of said pair of tines thereof;

wherein said pair of concave recesses in said plate of said blade communicate with said space therein, so together therewith, mimic said extended position through bore therein and form a retracted position through bore; and wherein said retracted position through bore in said plate of said blade is wider than said space therein.

22. The tool as defined in claim 21, wherein said first means includes
   a) a button; and
   b) second resilient biasing apparatus.

23. The tool as defined in claim 22, wherein said button comprises:
   a) an inner portion; and
   b) an outer portion;
   wherein said inner portion of said button has:
   a) a disk; and
   b) a post; and
   wherein said outer portion of said button has:
   a) a head; and
   b) a post.

24. The tool as defined in claim 23, wherein said outer portion of said button is mushroom-shaped.

25. The tool as defined in claim 23, wherein said disk of said inner portion of said button is smaller in diameter than said blind bore in said first portion of said housing;

wherein said disk of said inner portion of said button is smaller in depth than said blind bore in said first portion of said housing;

wherein said disk of said inner portion of said button directly corresponds in size to said extended position through bore in said plate of said blade;

wherein said disk of said inner portion of said button directly corresponds in size to said retracted position through bore in said plate of said blade; and wherein said disk of said inner portion of said button is larger in diameter than said through bore in said second portion of said housing.

26. The tool as defined in claim 23, wherein said post of said inner portion of said button extends concentrically upwardly from said disk thereof;

wherein said post of said inner portion of said button is narrower than said disk thereof;

wherein said post of said inner portion of said button is sized to fit through said extended position through bore in said plate of said blade;

wherein said post of said inner portion of said button is sized to fit through said retracted position through bore in said plate of said blade;

wherein said post of said inner portion of said button is sized to fit through said space in said plate of said blade; and wherein said post of said inner portion of said button is sized to fit through said through bore in said second portion of said housing.

27. The tool as defined in claim 23, wherein said head of said outer portion of said button fits in said blind bore in said second portion of said housing; and wherein said head of said outer portion of said button extends upwardly from said blind bore in said second portion of said housing.

28. The tool as defined in claim 23, wherein said post of said outer portion of said button extends concentrically downwardly from said head thereof;

wherein said post of said outer portion of said button is narrower than said head thereof;

wherein said post of said outer portion of said button fits through said through bore in said second portion of said housing; and wherein said post of said outer portion of said button extends coaxially from said post of said outer portion of said button.

29. The tool as defined in claim 23, wherein one of said post of said outer portion of said button and said post of said inner portion of said button has a diameter smaller than the other.

30. The tool as defined in claim 23, wherein said second resilient biasing apparatus is a spring.

31. The tool as defined in claim 30, wherein said spring of said second resilient biasing apparatus surrounds said post of said outer portion of said button;

wherein said spring of said second resilient biasing apparatus sits in said blind bore in said second portion of said housing; and wherein said spring of said second resilient biasing apparatus biases said head of said outer portion of said button away from said blind bore in said second portion of said housing, and in so doing, said disk of said inner portion of said button is lockingly engaged in one of said retracted position through bore in said plate of said blade and said extended position through bore in said plate of said blade, depending upon if said blade is in said retracted/stored position thereof or said extended operational position thereof, and in so doing, said blade is lockingly maintained in one of said retracted/stored position thereof and blocked against forward movement and said extended/operational position thereof and blocked against rearward movement, depending upon if said blade is in said retracted/stored position thereof or said extended operational position thereof.

32. The tool as defined in claim 30, wherein said spring of said second resilient biasing apparatus sits in said blind bore in said first portion of said housing;

wherein said spring of said second resilient biasing apparatus biases said disk of said inner portion of said button away from said blind bore in said first portion of said housing, and in so doing, said disk of said inner portion of said button is lockingly engaged in one of said retracted position through bore in said plate of said blade and said extended position through bore in said plate of said blade, depending upon if said blade is in said retracted/stored position thereof or said extended operational position thereof, and in so doing, said blade is lockingly maintained in one of said retracted/stored position thereof and blocked against forward movement and said extended/operational position thereof and blocked against rearward movement, depending upon if said blade is in said retracted/stored position thereof or said extended operational position thereof.

33. The tool as defined in claim 30, wherein said head of said outer portion of said button is depressed against biasing of said spring of said second resilient biasing apparatus causing said inner portion of said button thereof to move downwardly causing said disk of said inner portion of said button thereof to move down from, and disengage out of, one of said retracted position through bore in said plate of said blade and said extended position through bore in said plate of said blade, depending upon if said blade is in said retracted/stored position thereof or said extended operational position thereof, and sit in said blind bore in said first portion of said housing allowing said shaft of said inner portion of said button thereof to enter one of said retracted position through bore in said plate of said blade and said extended position through bore in said plate of said blade, depending upon if said blade is in said retracted/stored position thereof or said extended operational position thereof, and permit said plate of said blade to slide between said retracted/stored position thereof and said extended/operational position thereof by virtue of said space in said plate of said blade clearing, and not being blocked by, said shaft of said inner portion of said button when it is desired to release said plate of said blade from one of said retracted/stored position thereof and said extended position/operational position thereof.

34. The tool as defined in claim 20, wherein said first resilient biasing apparatus is at least one spring.

35. The tool as defined in claim 34, wherein said at least one spring of said first resilient biasing apparatus is a pair of springs.

36. The tool as defined in claim 34, wherein said at least one spring of said first resilient biasing apparatus sits in one of said primary channel in said first portion of said housing, said primary channel in said second portion of said housing, and said common channel in said housing, depending upon which exists.

37. The tool as defined in claim 34, wherein said at least one spring of said second means has:

a) a front end; and b) a rear end;

wherein said rear end of said at least one spring of said first resilient biasing apparatus abuts against said rear of at least one of said first portion of said housing and said second portion fo said housing, depending upon which of said one of said primary channel in said first portion of said housing, said primary channel in said second portion of said housing, and said common channel in said housing exists, and said front end of said at least one spring of said first resilient biasing apparatus abuts against said rear of said plate of said blade, and in so doing, bias said plate of said blade into said extended/operational position thereof for quick achievement thereof.

38. The tool as defined in claim 37, wherein said second means includes said first portion of said housing having at least one secondary channel.

39. The tool as defined in claim 38, wherein said at least one secondary channel in said first portion of said housing is a pair of secondary channels; and
wherein said pair of secondary channels in said first portion of said housing straddle said center channel therein.

40. The tool as defined in claim 38, wherein said at least one secondary channel in said first portion of said housing extends in said inner surface thereof;
wherein said at least one secondary channel in said first portion of said housing communicates with said primary channel therein;
wherein said at least one secondary channel in said first portion of said housing is narrower than said primary channel therein; and
wherein said at least one secondary channel in said first portion of said housing extends from short of said blind bore therein to into said rear thereof so as to form at least one seat.

41. The tool as defined in claim 40, wherein said second means includes said second portion of said housing having at least one secondary channel.

42. The tool as defined in claim 41, wherein said at least one secondary channel in said second portion of said housing is a pair of secondary channels; and
wherein said pair of secondary channels in said second portion of said housing straddle said center channel therein.

43. The tool as defined in claim 41, wherein said at least one secondary channel in said second portion of said housing extends in said inner surface thereof;
wherein said at least one secondary channel in said second portion of said housing communicates with said primary channel therein;
wherein said at least one secondary channel in said second portion of said housing is narrower than said primary channel therein;
wherein said at least one secondary channel in said second portion of said housing extends from short of said through bore therein to into said rear thereof so as to form at least one seat;
wherein said at least one seat in said rear of said second portion of said housing aligns with said at least one seat in said rear of said first portion of said housing; and
wherein said at least one secondary channel in said second portion of said housing align with said at least one secondary channel in said first portion of said housing.

44. The tool as defined in claim 43, wherein said second means includes said rear of said plate of said blade having a recess.

45. The tool as defined in claim 10, wherein said recess in said rear of said plate of said blade extends from short of one outer edge of said pair of tines of said plate of said blade so as to form therewith a tab to short of the other outer edge of said pair of tines of said plate of said blade so as to form therewith another tab; and
wherein said tab and said another tab assist in aligning said blade in said housing and provide a sturdier blade when extended.

46. The tool as defined in claim 44, wherein said at least one spring of said first resilient biasing apparatus sits in at least one of said at least one secondary channel in said first portion of said housing and said at least one secondary channel in said second portion of said housing, depending upon which exists, with the rear end thereof sitting in at least one of said at least one seat in said rear of said first portion of said housing and said at least one seat in said rear of said second portion of said housing, depending upon which exists, and with said front end thereof sitting in said recess in said rear of said plate of said blade, and in so doing, biases said plate of said blade into said extended/operational position thereof for quick achievement thereof.

47. The tool as defined in claim 41, wherein said at least one of said at least one secondary channel in said first portion of said housing and said at least one secondary channel in said second portion of said housing, depending upon which exists, prevents said at least one spring of said first resilient biasing apparatus from being exposed and from failing to operate or move to a position that would prevent extension thereof directly forward.

48. The tool as defined in claim 46, wherein said at least one of said at least one secondary channel in said first portion of said housing and said at least one secondary channel are of a number to accommodate said at least one spring of said first resilient biasing apparatus.

49. The tool as defined in claim 41, wherein said plate of said blade has at least one dimple/depression.

50. The tool as defined in claim 49, wherein said at least one dimple/depression of said plate of said blade extends at least one of vertically upwardly from said second housing portion-facing surface thereof and vertically downwardly from said first housing portion-facing surface thereof; and
wherein said at least one dimple/depression of said plate of said blade slidably engages in at least one of said at least one secondary channel in said second portion of said housing and said at least one secondary channel in said first portion, depending upon which exist and its location, to further guide said plate of said blade to and from said retracted/stored position thereof and said extend/operational position thereof by preventing lateral walking thereof and form another stop preventing said plate of said blade from extending to far out of said housing as it achieves said extended/operational position thereof.

51. The tool as defined in claim 1, wherein said second portion of said housing comprises more than one piece.

52. The tool as defined in claim 4, further comprising a ball marker assembly.

53. The tool as defined in claim 52, wherein said ball marker assembly comprises:
a) said outer surface of one of said first portion of said housing and said second portion of said housing having a ball marker blind bore therein;
b) a metal ball marker; and
c) a magnet;
wherein said metal ball marker releasably fits in said ball marker blind bore;
wherein said magnet is disposed in said ball marker blind bore; and
wherein said magnet is releasably engaged by said metal ball marker, but does not fully occupy said ball marker blind bore so as to form a ledge therewith and a space therebetween so as to allow said metal ball marker to be removed from said magnet by pressing on said metal ball marker over said space of said ball marker blind bore causing said metal ball marker to pivot upwardly on said ledge of said magnet.

54. The tool as defined in claim 1, wherein said second portion of said housing is smaller in depth than said first portion thereof.

55. The tool as defined in claim 1, wherein said housing has a rear;
wherein said rear of said housing has a through bore; and
wherein said through bore in said rear of said housing is for receiving one of a key ring and small key chain.

56. The tool as defined in claim 1, wherein said housing has a rear; and
wherein said rear of said housing is concave for having a grip of a golf club rest thereon when said blade is in said extended/operational position thereof and is stuck into grass so as to prevent the grip of the golf club from moisture and/or chemicals from the grass.

57. A golf green repair tool, comprising:
a housing;
a blade; and
c) first means;
wherein said blade is operatively attached to said housing;
wherein said blades moves axially relative to said housing;
wherein said blade has a retracted/stored position;
wherein said blade is contained within said housing when in said retracted/stored position thereof;
wherein said blade has an extended/operational position;
wherein said blade is extended axially out from said housing when in said extended/operational position thereof;
wherein said retracted/stored position of said blade and said extended/operational position are selectably achieved;
wherein said first means lockingly maintains said blade in each of said retracted/stored position thereof and said extended/operational position thereof by being engaged with said blade;
wherein said first means releases said blade from each of said retracted/stored position thereof and said extended/operational position thereof by being disengaged from said blade;
wherein axial movement of said blade from said retracted/stored position thereof to said extended/operational position thereof when said blade is lockingly maintained in said retracted/stored position by said first means is accomplished by disengaging said first means;
wherein axial movement of said blade from said extended/operational position thereof back to said retracted/stored position thereof when said blade is lockingly maintained in said extended/operational position thereof by said first means is accomplished by disengaging said first means and pushing said blade axially back into said housing;
wherein said housing comprises a first portion;
wherein said first portion of said housing has:
i) an outer surface;
ii) a front;
iii) a pair of sides; and
iv) a primary channel;
wherein said blade is a plate;
wherein said plate of said blade has:
i) a pair of tines; and
ii) a rear;
wherein said pair of tines of said plate of said blade extend from a bight zone to a pair of free ends;
wherein said pair of tines of said plate of said blade have a pair of outer edges;
wherein said first portion of said housing has a stationary shoulder;
wherein said plate of said blade has a movable shoulder; and
wherein said movable shoulder cooperates with said stationary shoulder.

58. The tool as defined in claim 57, wherein said stationary shoulder in said first portion of said housing protrudes inwardly from one side thereof into said primary channel therein; and
wherein said stationary shoulder in said first portion of said housing is disposed in proximity to said front thereof.

59. The tool as defined in claim 57, wherein said movable shoulder of said plate of said blade is disposed on one outer edge thereof;
wherein said movable shoulder of said plate of said blade is disposed in proximity to said rear thereof; and
wherein said movable shoulder of said plate of said blade prevents said plate of said blade from extending too far out of said housing as it achieves said extended/operational position thereof by stopping against said stationary shoulder in said first portion of said housing.

60. The tool as defined in claim 57, wherein said first means includes:
a) a blind slot; and
b) a recess.

61. The tool as defined in claim 60, wherein said blind slot of said first means:
a) is disposed in said first portion of said housing;
b) extends laterally from both the other side of said first portion of said housing and said recess of said first means to, and into, said one side of said first portion of said housing so as to form a seat;
c) opens into both the other side of said first portion of said housing and said recess of said first means;
d) communicates with said primary channel in said first portion of said housing;
e) is deeper than said primary channel in said first portion of said housing; and
f) is disposed between said front of said first portion of said housing and said stationary shoulder in said first portion of said housing.

62. The tool as defined in claim 61, wherein said seat in said one side of said first portion of said housing is:
a) narrower than said blind slot therein; and
b) coaxial with said blind slot therein.

63. The tool as defined in claim 61, wherein said recess of said first means is disposed in said outer surface of said first portion of said housing.

64. The tool as defined in claim 63, wherein said first means includes said plate of said blade having an extended position concave recess.

65. The tool as defined in claim 64, wherein said extended position concave recess in said plate of said blade extends vertically through one outer edge thereof; and
wherein said extended position concave recess in said plate of said blade is disposed between said bite zone thereof and said movable shoulder thereon.

66. The tool as defined in claim 64, wherein said first means includes said plate of said blade having a retracted position concave recess.

67. The tool as defined in claim 66, wherein said retracted position concave recess in said plate of said blade extends vertically through one outer edge thereof; and wherein said retracted position concave recess in said plate of said blade is disposed in proximity to an associated free end of said pair of tines thereof.

68. The tool as defined in claim 66, wherein said first means includes:

a) a lever; and b) at least one spring.

69. The tool as defined in claim 68, wherein said at least one spring of said first means is a pair of springs.

70. The tool as defined in claim 68, wherein said lever has:

a) a head;

b) a tail; and c) a pin;

wherein said tail of said lever is narrower than said head thereof so as to form at least one seat therewith; and wherein said pin of said lever extends vertically upwardly from said tail thereof.

71. The tool as defined in claim 70, wherein said head of said lever extends along said blind slot in said first portion of said housing;

wherein said head of said lever extends inwardly from said recess in said outer surface of said first portion of said housing to said tail thereof; and wherein said head of said lever is accessible from said recess in said outer surface of said first portion of said housing.

72. The tool as defined in claim 70, wherein said tail of said lever is sized to fit in said seat in said one side of said first portion of said housing.

73. The tool as defined in claim 70, wherein said at least one spring of said first means sits in said at least one seat on said head of said lever; and wherein said at least one spring of said first means extends to said one side of said first portion of said housing, and in so doing, bias said tail of said lever away from said seat in said one side of said first portion of said housing, and in so doing, said pin is lockingly engaged in one of said retracted position concave recess in said plate of said blade and said extended position concave recess in said plate of said blade, depending upon if said blade is in said retracted/stored position thereof or said extended operational position thereof, and in so doing, said blade is lockingly maintained in said retracted/stored position and blocked against forward movement or in said extended/operational position and blocked against rearward movement, depending upon if said blade is in said retracted/stored position thereof or said extended operational position thereof.

74. The tool as defined in claim 70, wherein said head of said lever is depressed inwardly against biasing of said at least one spring of said first means causing said tail of said lever to enter said seat in said one side of said first portion of said housing, and in so doing, causes said pin of said lever to move out from, and disengage out of, said retracted position concave recess in said plate of said blade or said extended position concave recess in said plate of said blade, depending upon if said blade is in said retracted/stored position thereof or said extended operational position thereof, and sit in said seat in said one side of said first portion of said housing permitting said blade to slide between said retracted/stored position thereof and said extended/operational position thereof when it is desired to release said blade from said retracted/stored position or said extended position/operational position.

75. The tool as defined in claim 70, wherein said tail of said lever is one of coaxial with said head thereof and at a side of said head thereof.

76. The tool as defined in claim 35, wherein said recess in said rear of said plate of said blade is divided in two so as to form a pair of seats that receive said front ends of said pair of coil springs, respectively.

* * * * *